July 10, 1945.　　　　E. A. MILLER　　　　2,379,980
LOCK NUT
Filed Sept. 29, 1943
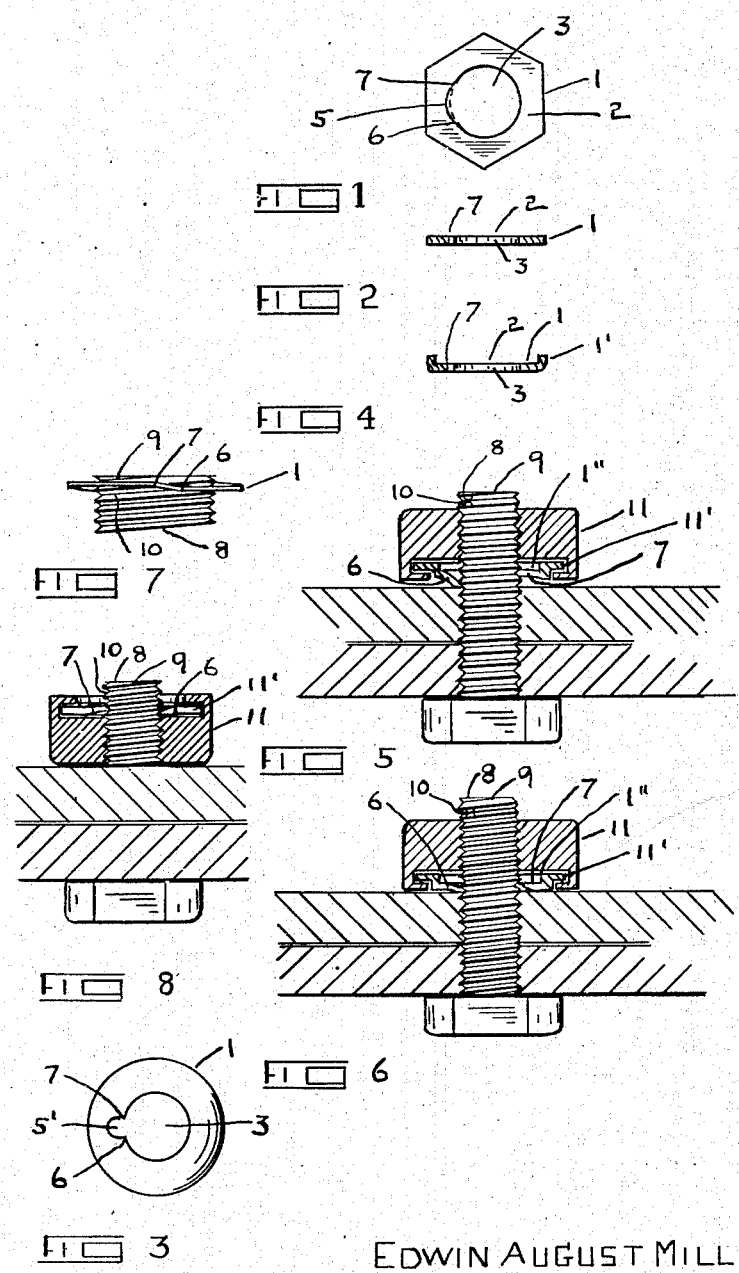
EDWIN AUGUST MILLER *INVENTOR.*
BY
George Henry Elwell
ATTY Patented July 10, 1945

2,379,980

UNITED STATES PATENT OFFICE 2,379,980

LOCK NUT

Edwin August Miller, Fairfield, Conn.

Application September 29, 1943, Serial No. 504,221

1 Claim. (Cl. 151—15)

This invention relates to lock-nuts manufactured from sheet-stock and especially to nut locking means provided by a flat area of the stock, which area until use remains in one plane.

With reference to the accompanying drawing, the Figure 1 is an upright face view of the lock-nut means; Figure 2 is a cross-sectional edge view of the same means; Figure 3 is an upright face view of a modification of the lock-nut; Figure 4 is a cross-sectional edge view of the modified lock-nut; Figure 5 is a cross-sectional view of a further modification of said lock-nut and holding nut in partial engagement with a threaded bolt and work assembly; Figure 6 is a like cross-sectional view with lock-nut and holding nut in full engagement with the bolt and work; Figure 7 is a fragmentary view of a threaded bolt illustrating relatively distorted positions of portions of the nut-means in use; and Figure 8 is a cross-sectional view of work-pieces secured by means of headed bolt and inverted nut means in use.

With more particular reference to the accompanying drawing, the numeral 1 designates the lock-nut means which comprises a stamped-out device having the flat portion 2 with a wrench-receiving contour and a lobsided perforation 3 extending centrally through the flat portion 2, the lobed portion 5 providing an enlargement of the perforation 3, the outline of the lobe 5 interrupting the otherwise circular outline of the perforation 3 at the points 6 and 7, said enlargement constituting an important part of the article of manufacture in the plane of the flat portion 2.

In use, the lock-nut is engaged with the free end, for instance, of a right-hand threaded shank 8 in such manner that, as the point 6 of the lobe 5 engages beneath the terminal 9 of the convolution 10 of the bolt thread, the point 7 engages and travels above the said terminal 9 as the lock-nut is turned clockwise thereon. Upon a full circumferential turn of the lock-nut the said point 6 has travelled the helical path of the screw-thread and has permanently become axially spaced from the point 7 as the point 6 enters beneath the said terminal 9, thereby distorting the lobed contour of the perforation 3 out of its original flat plane, as illustrated by the Figure 7. But, as the lock-nut is further turned down upon the shank 8 and is forcibly urged down upon and against a work-piece to be secured thereby, the point 6 so engaged by the work-piece is forced toward its original position in said plane of the flat portion 2, thereby establishing adjacent the points 6 and 7 a binding axial strain thereof against convolutions engaged thereby and contributing considerable frictional securement of the lock-nut upon the shank 8.

The Figure 3 illustrates the slight modification whereby the points 6 and 7 are more pronounced by means of the slot 5'. In use however the manner of securement is identical with that of the preferred form.

The Figure 4 illustrates a modification wherein there is added a flanged contour 1' of the lock-nut, the flange adding marginal rigidity to the structure but does not alter the manner of securement.

The Figures 5 and 6 illustrate a modification in which the lock-nut 1" is carried by a holding nut 11 in such manner as to present the lock-nut to the horizontal surface of a work-piece in the manner hereinbefore explained as when the locknut is used without a holding nut. For securing to the holding nut, the lock-nut is provided not only with a flange, as in the Figure 4, but also with the horizontal marginal rim 11' extending from the flange 1'.

The Figure 8 illustrates the lock-nut 1" carried by a holding nut 11 in reversed relation to the shank 8, the holding nut turned down upon the work forces the distorted points into a closer binding contact with their engaged convolutions of the shank.

I claim:

A lock-nut means comprising a flexible sheet-stock structure having a continuous unbroken contour; a central area in a flat plane provided by said structure; a substantially circular perforation extending through said area; an enlargement of said perforation, said enlargement interrupting the circular outline of said perforation at closely related points thereof in said plane; in combination with a threaded bolt upon which said means at said related points yields to contact relatively spaced convolutions of thread; and crowding means carried by said bolt and contributing to the urging of said related points toward said flat plane in binding contact with said convolutions.

EDWIN AUGUST MILLER.